United States Patent
Aburatani et al.

(10) Patent No.: US 7,569,642 B2
(45) Date of Patent: Aug. 4, 2009

(54) HIGHER OLEFIN POLYMER HAVING POLAR GROUP AND PROCESS FOR PRODUCING THE SAME

(75) Inventors: Ryo Aburatani, Chiba (JP); Masanori Sera, Chiba (JP); Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 121 days.

(21) Appl. No.: 10/575,109

(22) PCT Filed: Sep. 28, 2004

(86) PCT No.: PCT/JP2004/014559

§ 371 (c)(1),
(2), (4) Date: Dec. 12, 2006

(87) PCT Pub. No.: WO2005/035592

PCT Pub. Date: Apr. 21, 2005

(65) Prior Publication Data

US 2007/0073021 A1    Mar. 29, 2007

(30) Foreign Application Priority Data

Oct. 9, 2003    (JP)    .............................. 2003-350281

(51) Int. Cl.
C08F 8/18    (2006.01)
C08F 8/46    (2006.01)
C08F 8/00    (2006.01)
C08F 10/14    (2006.01)

(52) U.S. Cl. .................... 525/333.7; 525/301; 525/309; 525/334.1; 525/356; 525/359.1; 525/359.5

(58) Field of Classification Search ................. 525/301, 525/309, 333.7, 334.1, 356, 359.1, 359.5
See application file for complete search history.

(56) References Cited

U.S. PATENT DOCUMENTS

| 3,231,498 | A | 1/1966 | de Vries |
| 6,414,090 | B2 * | 7/2002 | Minami et al. ............... 525/338 |
| 7,019,080 | B2 * | 3/2006 | Kashihara et al. ........... 525/240 |

FOREIGN PATENT DOCUMENTS

| JP | 48-79639 | 10/1973 |
| JP | 59-122503 | 7/1984 |
| JP | 03-115403 | 5/1991 |
| JP | 8-504476 | 5/1996 |
| JP | 2001-527589 | 12/2001 |
| WO | 2003/002659 | 1/2003 |
| WO | WO 03/070786 A1 | 8/2003 |

OTHER PUBLICATIONS

Trafara G., "State of Order in Isotactic Polyhexylethylene", Journal of Polymer Science: Polymer Chemistry Edition, vol. 18, 1980, pp. 321-326, XP-002511080.

Trafara G., et al., "Haupt-und Seitenkettenkristallinitaet bei isotaktischen Poly(1-alkylaethylen)en, 1", Makromol. Chem., vol. 177, 1976, pp. 1089-1095, XP-002511081.

Russell, K.E., et al.,"Crystallization of Side Chains in Copolymers of Ethylene and 1-Alkenes", Journal of Polymer Science: Part B: Polymer Physics, vol. 34, 1996, pp. 2447-2458, XP-002511082, p. 2454, column 2, figure 8.

* cited by examiner

*Primary Examiner*—Fred M Teskin
(74) *Attorney, Agent, or Firm*—Oblon, Spivak, McClelland, Maier & Neustadt, P.C.

(57) ABSTRACT

A higher olefin polymer having a polar group which is produced by subjecting to an incorporation reaction of a polar compound or halogen compound into a higher α-olefin polymer satisfying the requirements of the following (1) and (2), which is obtained by polymerizing one or more higher α-olefins having 10 or more carbon atoms or copolymerizing one or more higher α-olefins having 10 or more carbon atoms with one or more other olefins and a method for producing a higher olefin polymer having a polar group which is obtained by polymerizing one or more higher α-olefins having 10 or more carbon atoms or copolymerizing one or more higher α-olefins having 10 or more carbon atoms with one or more other olefins to form a higher α-olefins polymer satisfying the requirements of the following (1) and (2) and subsequently subjecting to an incorporation reaction of a polar compound or halogen compound into the higher α-olefin polymer. (1) The content of units of a higher α-olefins having 10 or more carbon atoms is 50 mol % or more. (2) A single peak X1 which is ascribed to the side chain crystallization and observed at 15 deg<2θ<30 deg in a wide-angle X-ray scattering intensity distribution is observed.

20 Claims, No Drawings

HIGHER OLEFIN POLYMER HAVING POLAR GROUP AND PROCESS FOR PRODUCING THE SAME

TECHNICAL FIELD

The present invention relates to a higher olefin polymer having a polar group and a method for producing the same, and in particular, relates to a higher olefin polymer having a polar group which improves compatibility, mixability and adhesiveness of a higher olefin polymer and a method for producing the same.

BACKGROUND ART

A resin obtained by polarization of a polyolefin has been widely used industrially because its compatibility with various types of resin is improved.

Techniques for the modification of a polyolefin, which are variously known, are largely classified into techniques using an organic acid and techniques using a halogenide.

For example, a polyolefin modified with the organic acid has been used for the applications as a modifying agent and an adhesion promoter of various types of resins.

Moreover, the resin modified with halogen, especially chlorine have been industrially produced and used in various fields because they are soluble in an organic solvent as well as have excellent properties.

Among these, the resin having a higher chlorine content has been used as an anticorrosion paint of outdoor buildings because of their excellent weather resistance, and the resin having a lower chlorine content have been used as an ink for a polyolefin film and a primer for coating of a polyolefin molded product and the like because of their excellent adhesion to polyolefin.

A technique for modification with an organic acid, in which a decomposer that is a radical initiator and an organic acid are used, has been typically utilized (for example, Japanese Patent Application No. 2002-43543).

Furthermore, as the technique for modification with a halogenide, a technique using a suitable decomposer and a chlorine gas or a chlorine compound is known (for example, Japanese Examined Patent Application Publication No. 36-4745, Japanese Unexamined Patent Publication No. 48-8856, Japanese Unexamined Patent Publication No. 46-737 and Japanese Patent Application No. 2003-319652).

Meanwhile, a higher olefin polymer has been shown to have an increased melting point or two or more melting points when a conventional heterogeneous catalyst is used.

However, it has been disclosed that a homogeneous higher α-olefins polymer can be prepared by using a metallocene based catalyst which is characterized by structure (for example, Japanese Patent Application No. 2003-307164).

Further yet, there is a need for improvement of compatibility, mixability and adhesion because the higher α-olefin polymer has insufficient adhesion to a polar substrate or compatibility with a polar material and mixability with an inorganic material due to its lower polarity.

An object of the present invention, which was directed to solve the foregoing problem, is to provide a higher olefin polymer having a polar group which improves compatibility, mixability and adhesion of a higher olefin polymer and a method for producing the same.

DISCLOSURE OF THE INVENTION

As a result of conducting intensive studies to solve the foregoing problem, the inventor et al. have found out that the foregoing object has been achieved by polymerizing a higher olefin to form a higher olefin polymer and subsequently subjecting to an incorporation reaction of a polar compound or halogen compound, and thus completed this invention.

That is, the present invention is to provide a higher olefin polymer having a polar group which is produced by subjecting to an incorporation reaction of a polar compound or halogen compound into a higher α-olefin polymer satisfying the requirements of the following (1) and (2), which is obtained by polymerizing one or more higher α-olefins having 10 or more carbon atoms or copolymerizing one or more higher α-olefins having 10 or more carbon atoms with one or more other olefins, as well as to provide a method for producing a higher olefin polymer having a polar group which is obtained by polymerizing one or more higher α-olefins having 10 or more carbon atoms or copolymerizing one or more higher α-olefins having 10 or more carbon atoms with one or more other olefins to obtain a higher α-olefin polymer satisfying the requirements of the following (1) and (2) and subsequently subjecting to an incorporation reaction of a polar compound or halogen compound into the higher α-olefins polymer.

(1) The content of units of the higher α-olefin having 10 or more carbon atoms is 50 mol % or more.

(2) A single peak X1 is observed which is ascribed to the side chain crystallization observed at 15 deg<2θ<30 deg in a wide-angle X-ray scattering intensity distribution.

The higher olefin polymer having a polar group obtained by the production method of the present invention has high compatibility, mixability and adhesion due to its high polarity.

BEST MODE FOR CARRYING OUT THE INVENTION

Hereinafter, the present invention will be described in detail.

A higher olefin polymer having a polar group of the present invention is obtained by polymerizing one or more higher α-olefins having 10 or more carbon atoms, or copolymerizing one or more higher α-olefins having 10 or more carbon atoms with one or more other olefins to obtain a higher α-olefin polymer and subsequently by subjecting to an incorporation reaction of a polar compound or halogen compound into the higher α-olefin polymer.

As the higher α-olefin having 10 or more carbon atoms, an α-olefin having 10 to 35 carbon atoms is preferable, and there may be mentioned, for example, 1-decene, 1-undecene, 1-docecene, 1-tridecene, 1-tetradecene, 1-pentadecene, 1-hexadecene, 1-heptadecene, 1-octadecene, 1-nonadecene, 1-eicocene, 1-docecene, 1-tetracocene and the like, and 1, or 2 or more of which may be used.

Since the carbon number of the-higher α-olefin is 10 or more, the higher α-olefin polymer obtained by polymerization has a high crystalinity, and improved strength without stickiness.

Moreover, if the carbon number of the higher α-olefin is 35 or less, the higher α-olefin polymer obtained contains less unreacted monomers and forms a homogeneous composition having a narrower temperature range of fusion and crystallization.

Furthermore, as other olefins which are copolymerized with the higher α-olefin having 10 or more carbon atoms, an olefin having 2 to 30 carbon atoms is preferably used and the α-olefin is preferable.

Examples of the α-olefin include, for example, ethylene, propylene, 1-pentene, 4methylpentene-1,1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 1-dococene, 1-tetracocene and the like, and 1, or 2 or more of which may be used.

A higher α-olefin polymer, which is obtained by polymerizing one or more higher α-olefins having 10 or more carbon atoms or copolymerizing one or more higher α-olefins having 10 or more carbon atoms with one or more other olefins, satisfies the requirements of the following (1) and (2).

(1) The content of units of the higher α-olefin having 10 or more carbon atoms is 50 mol % or more.

(2) A single peak X1 is observed which is ascribed to the side chain crystallization observed at 15 deg<2θ<30 deg in a wide-angle X-ray scattering intensity distribution.

In the requirement (1), the content of units of a higher α-olefin is preferably 70 to 100 mol % and more preferably 85 to 100 mol %.

In particular, a polymer consisting of only a higher α-olefin having 10 or more carbon atoms is preferable.

If the content of units of a higher α-olefin having 10 or more carbon atoms is 50 mol % or more, a crystalline polymer is obtained which has a lower melting point, and improved compatibility with various substances such as solvents, oils, asphalts, lubricating oils and the like.

As described in the requirement (2), since a peak ascribed to the side chain crystallization is observed in a wide-angle X-ray scattering intensity distribution, a polymer obtained has a sufficient strength without stickiness.

Moreover, since the peak ascribed to the side chain crystallization is single, the polymer obtained has a sufficient strength without stickiness and also provides excellent storage stability and secondary workability.

In addition, the wide-angle X-ray scattering intensity distribution may be determined as follows:

Using an anticathodic rotor flex RU-200 manufactured by Rigaku Denki KK, a monochromatic light of CuK α ray (wavelength=1.54 Å) with an output power of 30 kV and 100 mA is collimated through a hole with a diameter of 1.5 mm and a wide-angle X-ray scattering intensity distribution (WAXS) is determined for 1 minute of light exposure by means of a position-sensitive proportional counter.

Examples of a polar groups in a higher olefin polymer having a polar group of the present invention include a fluorine atom, a chlorine atom, a bromine atom, an iodine atom, an ester group, a carboxyl group and a derivative thereof and the like, and chlorine atom, ester group, carboxyl group and carboxyl group derivative are preferable.

Further, it is preferable that a higher olefin polymer having a polar group of the present invention satisfies the following requirements (3) and (4).

(3) A polystyrene conversion weight-average molecular weight (Mw) measured by gel permeation chromatography (GPC) ranges from 1,000 to 100,000 and the molecular weight distribution (Mw/Mn) is more than 1.5.

(4) A polar group content or halogen content ranges from 0.01 to 70% by weight.

In the requirement (3), more preferably, the Mw ranges from 3,000 to 80,000 and Mw/Mn from 1.7 to 5.0.

When the Mw is 1,000 or more, the strength of the higher olefin polymer containing a polar group increases, and when the Mw is 100,000 or less, molding and mixing of the polymer becomes easy.

When the Mw/Mn is 5.0 or less, the strength of the higher olefin polymer containing a polar group increases because of the narrow distribution of components and of excellent surface characteristics without stickiness.

Furthermore, Mw/Mn is a value which is calculated from the polystyrene-conversion weight average molecular weight, Mw and number average molecular weight, Mn measured by gel permeation chromatography (GPC), for example, with the following equipment and conditions.
GPC Measuring Equipment
Column: TOSO GMHHR-H (S) HT
Detector: RI Detector for liquid chromatography WATERS 150 C
Measuring Conditions
Solvent: 1,2,4-trichlorobenzene
Measuring Temperature: 145° C.
Flow Rate: 1.0 ml/min
Sample Concentration: 2.2 mg/ml
Injection Volume: 160 μl
Calibration Curve: Universal Calibration
Analysis Programn HT-GPC (Ver. 1.0)

In the requirement (4), more preferably, the polar group content or halogen content is in the range of 0.1 to 70% by weight, and most preferably, in the range of 0.1 to 50% by weight.

Moreover, it is preferable that the chlorine atom content is in the rage of 0.01 to 70% by weight.

Furthermore, it is preferable that a higher olefin polymer having a polar group of the present invention satisfies the following requirements (5) and (6).

(5) The solubility into acetone/heptane (30/50 (volume ratio)) at 30° C. at a polymer concentration from 10 to 20% by weight is 99% or more by weight.

(6) The surface tension of wetting tension testing is in the range of 300 to 400 μN/cm.

In the requirement (5), more preferably, the solubility is 99.5% or more by weight.

In the requirement (6), more preferably, the surface tension of wetting tension testing is in the range of 320 to 400 μN/cm.

Further, it is preferable that a higher olefin polymer having a polar group of the present invention satisfies the following requirement (7).

(7) A melting point (Tm) is in the range of 20 to 100° C., which is observed from a fusion endothermic curve obtained by maintaining the higher olefin polymer having a polar group at 190° C. for 5 min under a nitrogen atmosphere, followed by maintaining at −10° C. for 5 min after decreasing the temperature to −10° C. at a rate of 5° C./min and subsequently increasing the temperature to 190° C. at a rate of 10° C./min using a differential scanning calorimeter (DSC).

A higher olefin polymer having a polar group which has such a range of melting point (Tm) hardly causes stickiness at ambient temperatures and is excellent in storage stability and secondary workability as well as excellent workability because it is homogeneously fused at a lower temperature.

Moreover, a higher olefin polymer having a polar group of the present invention has a half-value width (Wm) observed from a fusion endothermic curve obtained by using a DSC, which preferably is 10° C. or lower, and more preferably is 6° C. or lower, and especially preferably is from 2 to 4° C.

The half-value width (Wm) is defined as a peak width at the 50% height of an endothermic peak in determining a melting point (Tm) by a DSC. It means that the smaller the Wm, homogeneous crystals are formed, which shows homogeneity of material.

Further, a Wm of 10° C. or lower means that fusion behavior of the polymer is rapid.

For example, when a higher olefin polymer having a polar group is used as a main material of a temperature-sensitive adhesive, since the adhesive-nonadhesive switch temperature range becomes narrower, the adhesion can coordinate with the rapid change in temperature, leading to the improvement of the temperature responsiveness.

In the present invention, a method for obtaining a higher α-olefin polymer by polymerizing one or more higher α-olefins having 10 or more carbon atoms or copolymerizing one or more higher α-olefins having 10 or more carbon atoms with one or more other olefins is performed by using, for example, the following metallocene based catalysts, though the method is not specifically limited as long as a polymer is obtained. Among these catalysts, C1-symmetric or C2-symmetric transition metal compounds which can synthesize an isotactic polymer are preferably used.

That is, the method is a method for polymerizing one or more higher α-olefins having 10 or more carbon atoms or copolymerizing one or more higher α-olefins having 10 or more carbon atoms with one or more other olefins, in the presence of a catalyst for polymerization containing (A) a transition metal compound represented by the following general formula (I), and at least one kind of components selected from (B) (B-1) a compound which can form an ionic complex by reacting with the transition metal compound of the (A) component or its derivative and (B-2) an aluminoxane.

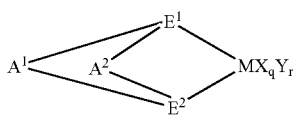
(I)

[wherein, M represents a metal element of the Groups 3 to 10 in the Period Table or the lanthanoid series; $E^1$ and $E^2$ are each a ligand selected from a substituted cyclopentadienyl group, an indenyl group, a substituted indenyl group, a heterocyclopentadienyl group, a substituted heterocyclopentadienyl group, an amido group, a phosphide group, a hydrocarbon group and a silicon containing group, which form a cross-linking structure via $A^1$ and $A^2$ and may be the same or different from each other; X represents a σ-binding ligand and when a plurality of Xs are present, these Xs may be the same or different and each X may cross-link with other X, $E^1$, $E^2$ or Y.

Y represents a Lewis base, and when a plurality of Ys are present, these Ys may be the same or different and each Y may cross-link with other Y, $E^1$, $E^2$ or X; $A^1$ and $A^2$ are each a divalent crosslinking group that bonds the two ligands and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$, —BR$^1$— or AlR$^1$; R$^1$ represents a hydrogen atom, a halogen atom, a hydrocarbon group having 1 to 20 carbon atoms or a halogen-containing hydrocarbon group having 1 to 20 carbon atoms which may be the same or different; q is an integer of 1 to 5 and represents [(the valence of M)-2]; and r represents an integer of 0 to 3.]

In the above general formula (I), M represents a metal element of the Groups 3 to 10 in the Period Table or the lanthanoid series, and examples of M include titanium, zirconium, hafnium, yttrium, vanadium, chromium, manganese, nickel, cobalt, palladium and a lanthanoid series metal and the like. Among these, titanium, zirconium and hafnium are preferable in terms of olefin polymerization activity and the like.

$E^1$ and $E^2$ represent each a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<] and a silicon-containing group [>SiR—, >Si<] (provided that R is hydrogen or a hydrocarbon group having 1 to 20 carbon atoms or a heteroatom-containing group), which form a cross-linking structure via $A^1$ and $A^2$.

Further, $E^1$ and $E^2$ may be the same or different from each other.

As the $E^1$ and E2, a substituted cyclopentadienyl group, an indenyl group and a substituted indenyl group are preferable.

Furthermore, X represents a σ-binding ligand, and when a plurality of Xs are present, these Xs may be the same or different and each X may cross-link with other X, $E^1$, $E^2$ or Y.

Examples of the X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulphide group having 1 to 20 carbon atoms and an acyl group having 1 to 20 carbon atoms and the like.

While, Y represents a Lewis base, and when a plurality of Ys are present, these Ys may be the same or different and each Y may cross-link with other Y, $E^1$, E2 or X.

Examples of the Lewis base of the Y include amines, ethers, phosphines and thioethers and the like.

Next, $A^1$ and $A^2$, which are each a divalent crosslinking group that bonds the two ligands, represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R1, —BR$^1$—or AlR$^1$, and R$^1$ represents a hydrogen atom, a halogen atom, a hydrocarbon group having 1 to 20 carbon atoms or a halogen-containing hydrocarbon group having 1 to 20 carbon atoms, which may be the same or different.

As such a crosslinking group, there may be mentioned, for example, a group represented by the following general formula;

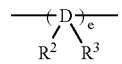

(wherein, D is carbon, silicon or tin; R$^2$ and R$^3$ are each a hydrogen atom or an hydrocarbon group having 1 to 20 carbon atoms, which may be the same or different form each other and may be bonded together to form a cyclic structure; e represents an integer of 1 to 4.), and examples of such a crosslinking group include methylene group, ethylene group, ethylidene group, propylidene group, isopropylidene group, cyclohexylidene group, 1,2-cyclohexylene group, vinylidene group (CH$_2$=C=), dimethylsilylene group, diphenylsilylene group, methylphenylsilylene group, dimethylgermylene group, dimnethylstanylene group, tetramethyldisilylene group, diphenyldisilylene group and the like.

Among these groups, ethylene group, isopropylidene group and dimethylsilylene group are preferable.

The character q is an integer of 1 to 5 and represents [(the valence of M)-2], and r represents an integer of 0 to 3.

Among the transition metal compounds represented by the above general formula (I), preferred is a transition metal compound, which have a double-crosslinked biscyclopentadienyl derivative as a ligand, represented by the following general formula (II).

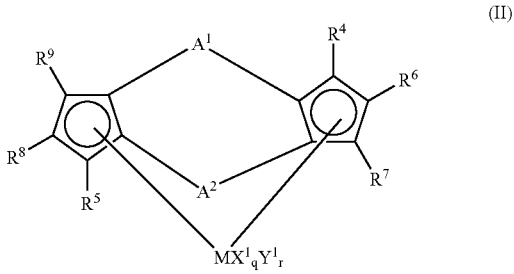

In the above general formula (II), M, $A^1$, $A^2$, q and r are the same as those of the general formula (I).

$X^1$ represents a σ-binding ligand, and when a plurality of $X^1$s are present, these $X^1$s may be the same or different, and each $X^1$ may cross-link with other $X^1$ or $Y^1$.

Examples of the $X^1$ include the same ligand as that exemplified by the description of X of the general formula (I).

$Y^1$ represents a Lewis base, and when a plurality of $Y^1$s are present, these $Y^1$s may be the same or different, and each $Y^1$ may cross-link with other $Y^1$ or $X^1$.

Examples of the $Y^1$ include the same base as that exemplified by the description of Y of the general formula (I).

$R^4$ to $R^9$ represent each a hydrogen atom, a halogen atom, a hydrocarbon group having 1 to 20 carbon atoms, a halogen-containing hydrocarbon group having 1 to 20 carbon atoms, a silicon-containing group or a heteroatom-containing group, at least one of which are required not to be a hydrogen atom.

Further, $R^4$ to $R^9$ may be the same or different from each other and adjacent groups may be bonded to each other to form a ring.

Above all, it is preferable that $R^6$ and $R^7$ form a ring, and $R^8$ and $R^9$ form a ring.

As $R^4$ and $R^5$, preferred are groups containing a heteroatom such as oxygen, halogen or silicon, thereby the polymerization activity is increased.

As a transition metal compound having a double-crosslinked biscyclopentadienyl derivative as the ligand, preferred is a compound which contains a silicon atom in a crosslinking group between the ligands.

Examples of the transition metal compound represented by the general formula (I) include, but not limited to, (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl) zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-i-propylindenyl)zirconium dichloride, (1,2'-dimethylsilylene)(2,1'-dimethylsilylene)-bis(3-trimethylsilylmethylindenyl) zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-diisopropylindenyl)zirconium dichloride, (1,2'-dimethylsilylene)(2,1'-dimethylsilylene)-bis(4phenylindenyl) zirconium dichloride, (1,2'-dimethylsilylene) (2,1'-dimethylsilylene)-bis(3-methyl-4-i-propylindenyl) zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-i-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-i-propylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-i-propylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl) zirconium dichloride, (1,2'-diphenylsilylene)(2,1'-methylene)-bis(3-trimethylsilylindenyl)zirconium dichloride, (1,2'-dimethylsilylene) (2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl) (3'-methylcyclopentadienyl) zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl) (3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl) (3'-methylcyclopentadienyl)zirconium dichloride, (1,2'-isopropylidene)(2,1'-isopropylidene)(3-methylcyclopentadienyl)(3'-methylcyclopentadienyl)

zirconium dichloride, (1,2'-dimethylsilylene)(2,1'-dimethylsilylene)(3,4-dimethylcyclopentadienyl)(3',4'-dinethylcyclopentadienyl) zirconium dichloride, (1,2'-dimethylsilylene)(2,1'-isopropylidene)(3,4-dimethylcyclopentadienyl)(3',4'-dimethylcyclopentadienyl) zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl) zirconium dichloride, (1,2'-ethylene)(2,1'-isopropylidene)(3,4dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl) zirconium dichloride, (1,2'-methylene)(2,1'-isopropylidene)(3,4-dimethylcyclopentadienyl)(3',4'-dimethylcyclopentadienyl) zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-S-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl) zirconium dichloride, (1,2'-dimethylsilylene)(2,1'-isopropylidene)(3-methyl-5-i-propylcyclopentadienyl)(3'-methyl-5'-i-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-i-propylcyclopentadienyl)(3'-methyl-5'-i-propylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl) zirconium dichloride, (1,2'-dimethylsilylene)(2,1'-methylene)(3-methyl-5-i-propylcyclopentadienyl)(3'-methyl-5'-i-propylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-i-propylcyclopentadienyl)(3'-methyl-5'-i-propylcyclopentadienyl)zirconium dichloride, (1,2'-ethylene)(2,1'-isopropylidene)(3-methyl-5-i-propylcyclopentadienyl)(3'-methyl-5'-i-propylcyclopentadienyl)zirconium dichloride, (1,2'-methylene)(2,1'-methylene)(3-methyl-5-i-propylcyclopentadienyl)(3'-methyl-5'-i-propylcyclopentadienyl)zirconium dichloride, (1,2'-methylene)(2,1'-isopropylidene)(3-methyl-5-i-propylcyclopentadienyl)(3'-methyl-5'-i-propylcyclopentadienyl)zirconium dichloride, (1,1'-dimethylsilylene)(2,2'-dirnethylsilylene)bisindenyl zirconium dichloride, (1,1'-diphenylsilylene)(2,2'-dimethylsilylene)bisindenyl zirconiurn dichloride, (1,1'-dimethylsilylene)(2,2'-dimethylsilylene)bisindenyl zirconium dichloride, (1,1'-diisopropylsilylene)(2,2'-dimethylsilylene) bisindenyl zirconium dichloride, (1,1'-dimethylsilylene)(2,2'-diisopropylsilylene)bisindenyl zirconium dichloride, (1,1'-dimethylsilyleneindenyl)(2,2'-dimethylsilylene-3-trimethylsilylindenyl)zirconium dichloride, (1,1'-diphenylsilyleneindenyl)(2,2'-diphenylsilylene-3-trimethylsilylindenyl) zirconium dichloride, (1,1'-diphenylsilyleneindenyl)(2,2'-dimethylsilylene-3-trimethylsilylindenyl)zirconium dichloride, (1,1'-dimethylsilylene)(2,2'-dimethylsilylene)(indenyl)(3-trimethylsilylindenyl)zirconiurn dichloride, (1,1'-diphenylsilylene)(2,2'-diphenylsilylene)(indenyl)(3-trimethylsilylindenyl)zirconium dichloride, (1,1'-diphenylsilylene)(2,2'-dimethylsilylene)(indenyl)(3-trimethylsilylindenyl)zirconium dichloride, (1,1'-dimethylsilylene)(2,2'-diphenylsilylene)(indenyl)(3-trimethylsilylindenyl) zirconium dichloride, (1,1'-diisopropylsilylene)(2,2'-dimethylsilylene)(indenyl)(3-trimethylsilylindenyl) zirconium dichloride, (1,1'-dimethylsilylene)(2,2'-diisopropylsilylene)(indenyl)(3-trimethylsilylindenyl)zirconium dichloride, (1,1'-diisopropylsilylene)(2,2'-diisopropylsilylene)(indenyl)(3-trimethylsilylindenyl)zirconium dichloride, (1,1'-dimethylsilylene)(2,2'-dimethylsilylene)(indenyl)(3-trimethylsilylmethylindenyl)zirconium dichloride, (1,1'-diphenylsilylene)(2,2'-diphenylsilylene)(indenyl)(3-trimethylsilylmethylindenyl)zirconium dichloride, (1,1'-diphenylsilylene)(2,2'-dimethylsilylene)(indenyl)(3-trimethylsilylmethylindenyl)zirconium dichloride, (1,1'-dimethylsilylene)(2,2'-diphenylsilylene)(indenyl)(3-trimethylsilylmethylindenyl)zirconium dichloride, (1,1'-diisopropylsilylene)(2,2'-dimethylsilylene)(indenyl)(3-trimethylsilylmethylindenyl)zirconium dichloride, (1,1'-dimethylsilylene)(2,2'-diisopropylsilylene)(indenyl)(3-trimethylsilylmethylindenyl)zirconium dichloride, (1,1'-diisopropylsilylene)(2,2'-diisopropylsilylene)(indenyl)(3-trimethylsilylmethylindenyl)zirconium dichloride and compounds obtained by substituting zirconium in these compounds with titanium and hafnium Further, there may also be used a compound containing a metal element belonging to the other groups or lanthanoid series. In the above-mentioned compound, the (1,1'-)(2,2'-) substituted compounds may be replaced with (1,2'-)(2,1'-) substituted compounds and the (1,2'-)(2,1'-) substituted compounds may be replaced with the (1,1'-)(2,2'-) substituted compounds.

Next, as the component (B-1) among the component (B), any compounds may be used as long as they are capable of forming an ionic complex by reacting with the transition metal compounds of the above components (A). However, there may be suitably used compounds represented by the following general formulas (III) and (IV):

$$([L^1\text{-}R^{10}]^{k+})_a([Z]^-)_b \quad \text{(III)}$$

$$([L^2]^{k+})_a([Z]^-)_b \quad \text{(IV)}$$

(provided that $L^2$ is $M^2$, $R^{11}R^{12}M^3$, $R^{13}{}_3C$ or $R^{14}M^3$.) [in the formulas (III) and (IV), $L^1$ represents a Lewis base, $[Z]^-$ represents a non-coordinate anion $[Z^1]^-$ and $[Z^2]^-$ wherein $[Z^1]^-$ is an anion in which a plurality of groups are bonded to an element, that is, $[M^1G^1G^2\ldots G^f]^-$ (wherein, $M^1$ represents an element in the Groups 5 to 15 of the periodic table, preferably an element in the Groups 13 to 15 of the Periodic Table. $G^1$ to $G^f$ each represents a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, alkylaryl group having 7 to 40 carbon atoms, arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more of $G^1$ to $G^f$ may form a ring. f represents an integer of [(the valence of the central metal $M^1$)+1], and $[Z^2]^-$ represents a conjugate base of a Bronsted acid alone or a combination of a Bronsted acid and Lewis acid in which the logarithm of the reciprocal of the acid dissociation constant (pKa) is −10 or less, or a conjugate base of the acid which is usually defined as an ultra-strong acid and may be coordinated by a Lewis acid. Furthermore, $R^{10}$ represents a hydrogen atom, an alkyl group having 1 to 20 carbon atoms, or an aryl group an alkylaryl group or arylalkyl group having 6 to 20 carbon atoms, and $R^{11}$ and $R^{12}$ each represents a cyclopentadienyl group, a substituted cyclopentadienyl group, an indenyl group or a fluorenyl group, and $R^{13}$ represents an alkyl group, an aryl group, alkylaryl group or an arylalkyl group having 1 to 20 carbon atoms. $R^{14}$ represents a large cyclic ligand such as tetraphenylporphyrin and phthalocyanine and the like. The character k is an ion valence of $[L^1-R^{10}]$, $[L^2]$ and is an integer of 1 to 3, and a is an integer of 1 or more, and b=(k×a). $M^2$ contains an element in the Groups 1 to 3, 11 to 13 and 17 of the Periodic Table, and $M^3$ represents an element in the Groups 7 to 12 of the Periodic Table.]

Here, examples of $L^1$ include amines such as ammonia, methylamine, aniline, dimethylamine, diethylamine, N-methylaniline, diphenylamnine, N, N-dimethylaniline, trimethylamine, triethylamine, tri-n-butylamine, methyldiphenylamine, pyridine, p-bromo-N, N-dimethylaniline and p-nitro-N, N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Examples of $R^{10}$ include hydrogen, a methyl group, an ethyl group, a benzyl group and a trityl group, and examples of $R^{11}$ and $R^{12}$ include a cyclopentadienyl group, a methylcyclopentadienyl group, an ethylcyclopentadienyl group and a pentamethylcyclopentadienyl group.

Examples of $R^{13}$ include a phenyl group, a p-tolyl group and p-methoxyphenyl group, and examples of $R^{14}$ include tetraphenylporphyline, phthalocyanine, allyl and methallyl.

Furthermore, examples of $M^2$ include Li, Na, K, Ag, Cu, Br, I and 13, and examples of $M^3$ include Mn, Fe, Co, Ni and Zn.

Moreover, in $[Z^1]^{31}$, i.e., $[M^1G^1G^2\ldots G^f]$, examples of $M^1$ include B, Al, Si, P, As and Sb, preferably B and Al.

Furthermore, examples of $G^1$ and $G^2$ to $G^f$ include a dialkylamino group such as a dimethylamino group and a diethylamino group and the like; an alkoxy group or an aryloxy group such as a methoxy group, an ethoxy group, a n-butoxy group and phenoxy group and the like; a hydrocarbon group such as a methyl group, an ethyl group, a n-propyl group, an isopropyl group, a n-butyl group, an isobutyl group, a n-octyl group, a n-eicosyl group, a phenyl group, a p-tolyl group, a benzyl group, a 4-t-butylphenyl group and a 3,5-dimethylphenyl group and the like; a halogen atom such as fluorine, chlorine, bromine and iodine and the like; a heteroatom-containing hydrocarbon group such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group and a bis(trimethylsilyl)methyl group and the like; and a organic metalloid group such as a pentamethylantimony group, a trimethylsilyl group, a trimethylgermil group, a diphenylarsine group, a dicyclohexylantimony group and diphenyl boron and the like.

Furthermore, examples of the non-coordinate anion, i.e., the conjugate base $[Z^2]^-$ of the Bronsted acid alone or the combination of the Bronsted acid and the Lewis acid in which pKa is −10 or less include a trifluoromethanesulfonic acid anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchloric acid anion $(ClO_4)^-$, a trifluoroacetic acid anion $(CF_3CO_2)^-$; a hexafluoroantimony anion $(SbF_6)^-$; a fluorosulfonic acid anion $(FSO_3)^-$; a chlorosulfonic acid anion $(ClSO_3)^{31}$, a fluorosulfonic acid anion/5-antimony fluoride $(FSO_3/SbF_5)^-$, a fluorosulfonic acid anion/5-arsenic fluoride $(FSO_3/AsF_5)^-$ and a trifluoromethanesulfonic acid/5-antimony fluoride $(CF_3SO_3/SbF_5)^-$ and the like.

Examples of the (B-1) component compound include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylamnonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammnonium tetras(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetraki(pentafluorophenyl)borate, dimethylanium tetraki[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetras(pentafluorophenyl)borate, sodium tetrakis(pentafluorophenyl)borate, tetraphenylporphyrinmanganese tetrakis(pentafluorophenyl)

borate, silver tetrafluoroborate, siver hexafluorophosphate, silver hexafluoroarsenate, silver perchlorinate, silver trifluoroacetate and silver trifluoromethanesulfonate and the like.

The (B-1) component may be used alone or in combination with two or more thereof.

While, as the aluminoxane of the (B-2) component, there may be mentioned a chain aluminoxane represented by the following general formula (V);

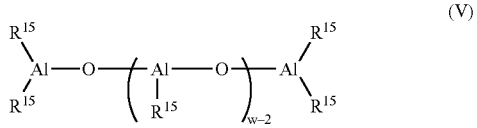

(wherein, $R^{15}$s each represent a hydrocarbon group such as an alkyl group, an alkenyl group, an aryl group or arylalkyl group having 1 to 20 carbon atoms, preferably 1 to 12 carbon atoms, or a halogen atom; w represents an average polymerization degree and is an integer of usually 2 to 50 and preferably 2 to 40; moreover, respective $R^{15}$s may be the same or different from each other.), and a cyclic aluminoxane represented by the following general formula (VI);

(wherein, $R^{15}$ and w are the same as defined in the above general formula (V).)

As a method of producing the aluminoxanes, there may be mentioned a method in which an alkylaluminum is brought into contact with a condensation agent such as water. However, the means is not specifically limited and the reaction may be carried out according to a known method.

For example, there are (a) a method in which an organoaluminum compound is dissolved in an organic solvent and then the resultant solution is brought into contact with water, (b) a method in which an organoaluminum compound is added at the initial stage of polymerization and then water is added, (c) a method in which crystal water contained in a metal salt, etc. or water adsorbed in inorganic or organic substances are reacted with an organoaluminum compound, and (d) a trialkylaluminum is reacted with a tetraalkyldialuminoxane and further reacted with water.

In addition, as aluminoxanes, the one which is insoluble in toluene may be used.

These aluminoxanes may be used alone or in combination with two or more thereof.

When the compound (B-1) is used as the catalyst component (B), the use ratio of the catalyst component (A) to the catalyst component (B) is preferably in the range of 10:1 to 1:100 and more preferably 2:1 to 1:10 in terms of a molar ratio. If the use ratio of the catalyst compound (A) to the catalyst component (B) is within the above range, it is practical because the catalyst cost per unit mass polymer is not increased too much.

Further, when the compound (B-2) is used as the catalyst component (B), the molar ratio of the catalyst component (A) to the catalyst component (B) is preferably in the range of 1:1 to 1:1000000 and more preferably 1:10 to 1:10000.

If the use ratio of the catalyst compound (A) to the catalyst component (B) is within the above range, it is practical because the catalyst cost per unit mass polymer is not increased too much.

Furthermore, as the catalyst component (B), the (B-1) or (B-2) compound may be used alone or in combination with any two or more thereof.

Further, as a polymerization catalyst used for the production of a higher α-olefin polymer in the present invention, there may be used an organoaluminum compound as the component (C) in addition to the above components (A) and (B).

Here, as the organoaluminum compound of the component (C), a compound may be used which is represented by the following general formula (VII):

[wherein, $R^{16}$ represents an alkyl group having 1 to 10 carbon atoms, J represents a hydrogen atom, an alkoxy group having 1 to 20 carbon atoms, an aryl group having 6 to 20 carbon atoms or a halogen atom, and v is an integer of 1 to 3.]

Examples of the compound represented by the above general formula (VII) include trimethylaluminum, triethylaluminum, triisopropylaluminum, triisobutylaluminum, dimethylaluminium chloride, diethylaluminium chloride, methylaluminium dichloride, ethylaluminium dichloride, dimethylalunminium fluoride, diisobutylaluminium hydride, diethylaluminium hydride, ethylaluminium sesquichloride.

These organoaluminum compounds may be used alone or in combination of two or more thereof.

The use ratio of the catalyst component (A) to the catalyst component (C) is preferably in the range of 1:1 to 1:10000, more preferably 1:5 to 1:2000, most preferably 1:10 to 1:1000 in terms of a molar ratio.

Though the polymerization activity per transition metal may be increased by the use of the catalyst component (C), the use of too large amount of it is not preferable because it remains in large quantities in a polymer, as well as the organoaluinum compound is wasteful.

In the production of a higher α-olefin polymer in the present invention, at least one kind of catalyst component may be supported on a suitable carrier and then used.

The type of the carrier is not specifically limited, and there may be used any of inorganic oxide carriers, other inorganic carriers and organic carriers. However, inorganic oxide carriers and other inorganic carriers are particularly preferable.

A polymerization method of a higher α-olefin polymer in the present invention is not specifically limited, and there may be used any of methods such as a slurry polymerization, a gaseous phase polymerization, a mass polymerization, a solution polymerization and a suspension polymerization and the like. However, the slurry polymerization and the gaseous phase polymerization are especially preferable.

Regarding the polymerization conditions, the polymerization temperature is typically between −100° C. and 250° C., preferably between −50° C. and 200° C., and more preferably between 0° C. and 130° C.

The polymerization time is typically between 5 min and 10 hrs, and the reaction pressure is preferably between atmospheric pressure and 20 MPa (gauge), and more preferably between atmospheric pressure and 10 MPa (gauge).

In the production method of a higher α-olefin polymer in the present invention, hydrogen is preferably added because the polymerization activity is increased.

When hydrogen is used, the reaction pressure is typically between atmospheric pressure and 5 MPa (gauge), preferably between atmospheric pressure and 3 MPa (gauge), and more preferably between atmospheric pressure and 2 MPa (gauge).

In the case where a polymerization solvent is used, examples of the solvent include aromatic hydrocarbons such as benzene, toluene, xylene and ethylbenzene and the like; alicyclic hydrocarbons such as cyclopentane, cyclohexane and methylcyclohexane and the like; aliphatic hydrocarbons such as pentane, hexane, heptane and octane and the like; and halogenated hydrocarbons such as chloroform and dichloromethane and the like.

These solvents may be used alone or in combination of two or more thereof.

Further, a monomer such as an α-olefin may be used as a solvent.

Incidentally, the polymerization may be conducted without using any solvent, depending upon the polymerization method.

In the polymerization, a preliminary polymerization may be conducted by using the above-mentioned polymerization catalysts.

Although the preliminary polymerization may be performed by bringing, for example, a small amount of the olefin into contact with the solid catalyst component, the method is not specifically limited, and a known method may be used.

The olefin used for the preliminary polymerization is not specifically limited, and there may be used the same olefins as exemplified above, for example, ethylene, olefins having 3 to 20 carbon atoms or mixtures thereof. However, there may be advantageously used the same olefin as the higher α-olefin or olefin used in the preliminary polymerization.

A preliminary polymerization temperature is typically between −20° C. and 200° C., preferably between −10° C. and 130° C., and more preferably between 0° C. and 80° C.

In the preliminary polymerization, there may be used an aliphatic hydrocarbon, an aromatic hydrocarbon and a monomer and the like as a solvent.

Among these, the aliphatic hydrocarbon is especially preferable.

Further, the preliminary polymerization may be conducted without using any solvent.

It is preferred that the preliminary polymerization conditions be adjusted such that the polymerization product has a limiting viscosity [η] (as measured in decalin at 135° C.) of 0.1 dL/g or higher and the amount of the preliminary polymerization product per mmol of the transition metal component in the catalyst is in the range of 1 to 10000 g, especially 10 to 1000 g.

Further, methods for adjusting the molecular weight of the polymer include the kind of each catalyst component, the amount used, selection of the polymerization temperature and the polymerization in the presence of hydrogen.

The molecular weight of a polymer may also be adjusted in the presence of an inert gas such as nitrogen.

In the present invention, the polymerization is performed by obtaining the above-mentioned α-olefin polymer, followed by incorporation of a polar compound and a halogenated compound.

Hereinafter, the incorporation of the polar compound will be explained.

In the present invention, the incorporation of the polar compound is referred to as, for example, acid modification. A typical technique for the acid modification of a polyolefin is applicable in the present invention and may be performed by using a radical initiator (a decomposer) and an-organic acid.

Examples of the above organic acid include, but not specifically limited to, an unsaturated carboxylic acid and a derivative thereof.

Examples of the unsaturated carboxylic acid include acrylic acid, methacrylic acid, maleic acid, fumaric acid, itaconic acid, crotonic acid, citraconic acid, sorbic acid, methaconic acid and angelic acid and the like.

Further, as the derivative of the unsaturated carboxylic acid, there may be mentioned an acid anhydride, an ester, an amide, an imide and metal salt of thereof, and there may be used maleic anhydride, itaconic anhydride, citraconic anhydride, methyl acrylate, methyl methacrylate, ethyl acrylate, butyl acrylate, maleic acid monoethylester, acrylamide, monoamide maleate, maleimide, N-butylmaleimide, sodium acrylate and sodium methacrylate. Among these, maleic anhydride, acrylic acid and acrylate are preferable and maleic anhydride is more preferable. Further, these may be used alone or in combination of two or more thereof.

As the above radical initiator which is not specifically limited, there may be appropriately selected and used a conventionally known radical initiator, for example, various organic peroxides and an azo compound such as azobisisobutyronitrile and azobisisovarelonitrile. Among these, the organic peroxides are preferable.

Examples of the organic peroxides include diacylperoxides such as dibenzoylperoxide, di-3,5,5-trimethylhexanoylperoxide, dilauroylperoxide, didecanoylperoxide and di(2,4-dichlorobenzoyl)peroxide; hydroperoxides such as t-butylhydroperoxide, cumenehydroperoxide, diisopropylbenzene hydroperoxide, 2,5-dimethylhexane-2,5-dihidroperoxide, dialkylperoxide such as di-t-butylperoxide, dicumylperoxide, 2,5dimethyl-2,5-di(t-butylperoxy)hexane, 2,5-dimethyl-2,5-di(t-butylperoxy)hexine-3,α,α'bis(t-butylperoxy)diisopropyl benzene; peroxyketals such as 1,1-bis-t-butylperoxy-3,3,5-trimethylcyclohexane, 2,2-bis(t-butylperoxy)butane; alkylperesters such as t-butylperoxyoctoate, t-butylperoxypivalate, t-butylperoxyneodecanoate, t-butylperoxybenzoate; and peroxycarbonates such as di-2-ethylhexylperoxydicarbonate, diisopropylperoxydicarbonate, di-sec-butylperoxydicarbonate and t-butylperoxyisopropylcarbonate.

Among these, dialkylperoxides are preferable.

Further, these may be used alone or in combination of two or more thereof.

The amount used of the organic acid and the radical initiator is not specifically limited, and is selected as appropriate, depending on the desired properties of the olefin polymer of interest. The organic acid is usually used in the range of 0.1 to 50 weight parts, preferably 0.1 to 30 weight parts, and the radical initiator in the range of 0.01 to 10 weight parts, preferably 0.01 to 5 weight parts, based on 100 weight parts of the olefin polymer used.

The acid treatment methods include, but not specifically limited to, for example, a method in which the reaction of the olefin polymer with the organic acid and the radical initiator is performed by fusing and kneading at a temperature range of 100 to 300° C. using a roll mill, a Banbury mixer or an extruder, or a method in which the reaction is performed at a temperature range of −50 to 300° C. in hydrocarbon-based solvents such as butane, pentane, hexane, heptane, cyclohexane and toluene, halogenated hydrocarbon-based solvents such as chlorobenzene, dichlorobenzene and trichlorobenzene, and in suitable organic solvents such as a liquefied α-olefin.

The obtained higher olefin polymer containing a polar group may be used after pelletizing by a known method.

Further, the above polymer may be shipped by dissolving in a suitable organic solvent such as toluene, cyclohexane, 1,1,2-trichloroethane and the like.

Furthermore, the obtained higher olefin polymer containing a polar group exhibits a viscosity lower than that of polypropylene and polyethylene having the same molecular weight.

Next, the incorporation of the halogenated compound will be described.

The halogenated compound represents a halogen and a compound containing halogen. As a halogen, there may be mentioned fluorine, chlorine, bromine, iodine and the like. Of these, chlorine is preferable.

Hereinafter, a halogenation method by incorporating a halogen as a halogen gas will be explained.

The higher α-olefin polymer obtained by the above-mentioned method and a hydrocarbon-based solvent are compatible, and when they are heated and fused, they are mixed at any ratio to form a homogeneous liquid state.

The available hydrocarbon solvent is not specifically limited as long as it has a boeling point of 50° C. or higher and is liquid at room temperature, and there may be generally used hexane, heptane, octane, isooctane, cyclohexane, toluene, xylene and the like.

When the concentration of the higher α-olefin polymer in the hydrocarbon solvent is in the range of 5 to 7% by weight, it is advantageous for industrial production and preferable because no coloration occures.

Further, when a viscosity of both mixtures is 3 Pa-s (3000 cps) or less at a temperature where the halogenation is performed, it is preferable because the halogenation reaction will not proceed locally and vigorously without carbonization of the resin.

In order to decrease the viscosity to 3 Pa-s (3000 cps) or lower, the adjustment may be made by changing the ratio of the hydrocarbon to the polyolefin or the temperature.

The amount of the halogen atom incorporated by halogenation is preferably in the range of 5 to 70% by weight to the higher α-olefin polymer because of the excellent efficiency of halogenation.

In general, a polyolefin may be easily dissolved in an organic solvent because the crystal structure of a polymer is collapsed as a halogen atom is incorporated.

The halogenation reaction may be carried out in a reaction tank with glass lining inside which is equipped with a stirrer, a chlorine injection inlet, byproduct waste gas treatment equipment and a jacket for heating.

An ultraviolet lamp is installed inside the tank when necessary.

The stirring with a strong agitation is preferable to proceed homogeneously.

The tank is preferably configured such that the halogen gas is injected from the bottom in order to increase the reaction efficiency.

When the halogenation is performed by injecting the halogen gas, for the efficient proceeding of the reaction, it is preferable to use ultraviolet irradiation and a radical initiator such as an organic peroxide and an azo compound as a catalyst (a decomposer). However, without using these catalysts, the halogenation proceeds.

Although the halogen gas may be injected directly for halogenation, the gas may be diluted with an inert gas such as nitrogen and a hydrogen chloride gas.

This case has an advantage that it becomes easy to control the reaction and it is possible to prevent the increase in the temperature of the system by the reaction heat.

The temperature of the halogenation reaction is not specifically limited as long as it is a temperature where the mixture can maintain the liquid state. Since a dehalogenation reaction may easily occur simultaneously with the halogenation reaction and cause coloration at a higher temperature, the reaction is preferably performed at a low temperature as possible. The temperature is preferably in the range of 30 to 140° C. in order to prevent the halogenated compound from causing coloration without slowing down the reaction rate.

After the halogenation reaction, the product may be recovered by removing the hydrocarbon solvent under vacuum or under heating.

Moreover, after preparing the product at a suitable concentration as necessary, the resultant product may be shipped as a finished product as is.

Next, a method of halogenation by incorporating a halogen as a halogen-containing compound will be explained.

Examples of the halogen-containing compound include $SO_2Cl_2$, $SOCl_2$, $AlCl_3$, ethylaluminum chloride, diethylaluminum chloride, $TiCl_4$, $MgCl_2$, ethylmagnesium chloride and the like.

As the reaction solvent, there may be used a hydrocarbon-based solvent, an aromatic-based solvent and a halogen-ontaining solvent, and there may be mentioned, for example, normal hexane, normal heptane, normal octane, toluene, xylene, chloroform, carbon tetrachloride, 1,1,2-trichloroethylene, chlorobenzene, orthodichlorobenzene and the like. These solvents may be used by mixing two or more thereof.

In the case where two or more solvents are mixed, one of which is preferably the halogen-containing solvent.

If the ratio of the higher α-olefin polymer to the halogen-contain compound, which is varied depending on the halogenation ratio desired, is 0.1 to 100 weight parts of the halogen-containing compound based on 100 weight parts of the higher (α-olefin polymer, a sufficient effect is obtained and purification after reaction is easily performed.

If the concentration of the higher α-olefin polymer in the reaction is 1 to 70% by weight, it is industrially preferable because the productivity is excellent, and an homogeneous dissolution is obtained, thus enabling a stable production without the increase in the viscosity of the solution.

The reaction temperature is preferably in the range from room temperature to n 200° C. or lower, but is not limited to this range if a raw material polymer is homogeneously dissolved.

After the reaction, the product mixture may be purified by precipitating in a suitable solvent such as water, methanol, ethanol and the like.

In this case, the purification may be performed after properly concentrating and distilling off the solvent under vacuum or under heating.

The higher olefin polymer having a polar group, which is halogenated by the above halogen gas or a halogen-containing compound, may be obtained in a solid state, and the finished product is obtained by pelletizing by a known method or dissolving in an organic solvent such as toluene, xylene and cyclohexane.

As with the acid-modified higher olefin polymer having a polar group, the halogenated higher olefin polymer having a polar group exhibits a viscosity lower than that of polypropylene and polyethylene having the same molecular weight.

Next, the present invention will be explained in detail with reference to the examples. However, it should be understood that the present invention is by no means restricted to such specific examples.

Now, methods of evaluating properties in the production examples and examples will be explained.

(a) Wide-Angle X-ray Scattering Intensity Distribution Measured by the method described in the text of the specification (b) Polystyrene-Conversion Weight Average Molecular Weight (Mw) Molecular Weight Distribution (Mw/Mn)

Measured by the Method Described in the Text of the Specification (c) DSC Measurement The melting point (Tm) of the top of the peak was measured, which was observed from a melting endothermic (ΔH) curve obtained with a differentia scanning calorimeter (manufactured Perkin-Elmer, DSC-7) by holding 10 mg of sample at 190° C. for 5 min in a nitrogen atmosphere, followed by decreasing the temperature at a rate of 5° C./min to −10° C. and maintaining the sample at −10° C. for 5 min and subsequently increasing the temperature at a rate of 10° C./min to 190° C.

(d) Half-Value Width (Wm)

Measured by the method described in the text of the specification (e) Polar Group Content (e-1) Acid Modification Quantity The acid modification quantity was calculated by measuring IR after pressing a blended mixture of a premodified higher α-olefin polymer and an organic acid with a spacer of 0.1 mm thick, and creating a calibration curve from the absorption at bands (1600 to 1900 cm-1) and the feed amount of the organic acid, and subsequently performing the IR measurement of the press plate of the acid modified material and determining the modification rate.

IR measurement equipment: FT/IR-5300 manufactured by JASCO International Co., Ltd.

(e-2) Halogen Content

The halogenated higher α-olefin polymer was heated and dissolved in hexane and to the solution was added polyethylene powder. After distilling off the hexane, the residual polymer was vacuum dried. The resultant polymer was thermally pressed at 160° C. and then a halogen content was quantified using fluorescent X-rays.

(f) Solubility at 30° C. Into Acetone/Heptane (30/50 (Volume Ratio)) at 10 to 20% by Weight Concentration of Polymer To 5 g of the polymer obtained from the production examples or examples was added 40 ml of mixed solvent of acetone/n-heptane, and then the solubility was evaluated observing the resultant solution state at 30° C. based on the following criteria.

Excellent: Completely dissolved, and the solution is transparent

Good: A slightly white turbidity appears but 99% or more by weight of the polymer is dissolved Acceptable: A white turbidity appears but the insoluble polymer is not precipitated Poor: Not dissolved or separated into two solutions (g) Wetting tension test The wetting tension was determined which is a measure of ability to retain ink, coating and adhesives and the like on a plastic film surface.

It is empirically known that the retention ability of ink, coating and adhesives and the like is improved as the wetting tension on the plastic film surface is increased.

The evaluation was performed in accordance with a method as specified in JIS K6768 "plastics—films and sheeting—the testing method of wetting tension".

A film for evaluation was prepared by covering the sample polymer with Teflon sheet (Teflon is a trademark) and pressing using a spacer of 0.3 mm thick at 230° C.

The film was allowed to stand at room temperature for 8 hrs.

The evaluation was made as "being wetting" when the original state is maintained without the liquid film being broken at the elapse of 2 seconds after coating the film with the mixed solution soaked in a cotton swab using Wetting Tension Test Mixed Solution manufactured by Wako Pure Chemical Industries Ltd.

The test was sequentially performed starting from a mixed solution for test with a lower surface tension, and the maximum surface tension of the mixed solution which was evaluated as "being wetting" was used as the wetting tension of the film.

PRODUCTION EXAMPLE 1

Preparation of (1,2'-dimethylsilylene)(2,1'-dimethylsilylene)bis(3-trimethylsilylmethylindenyl)zirconium dichloride 3.0 g (6.97 mmol) of lithium salt of (1,2'-dimethylsilylene)(2,1'-dimethylsilylene)-bis(indene) was dissolved in 50 ml of THF (tetrahydrofuran) in a Schrenk bottle and the resultant solution was cooled to −78° C.

To the solution was dropwise added 2.1 ml (14.2 mmol) of iodotrimethylsilane, followed by stirring at room temperature for 12 hrs.

The solvent was distilled off, 50 ml of ether was added and subsequently washed with saturated ammonium chloride solution.

After separation, the organic phase was dried and the solvent was distilled off to obtain 3.04g (5.88 mmol) of (1,2'-dimethyisilylene)(2,1'-dimethylsilylene)bis(3-triethylsilylmethylindene). (Yield, 84%)

Then, to the Schrenk bottle was added 3.04 g (5.88 mmol) of(1,2'-dimethylsilylene)(2,1'-dimethylsilylene)-bis(3-trimethylsilylmethylindene) obtained by the above methods and 50 ml of ether under a nitrogen flow.

The resultant solution was cooled to −78° C., followed by dropwise adding a hexane solution of n-BuLi (1.54M, 7.6 ml (1.7 mmol)).

The temperature of the solution was increased to room temperature, followed by stirring for 12 hrs and subsequently distilling off the ether.

The solids obtained were washed with 40 ml of hexane to obtain 3.06 g (5.07 mmol) of the lithium salt as an ether addition product (yield, 73%).

The measurement results by $^1$H-NMR (90 MHz, TBF-$d_8$) were δ0.04 (s, 18H, trimethylsilyl); 0.48 (s, 12H, dimethylsilylene); 1.10 (t, 6H, methyl); 2.59 (s, 4H, methylene); 3.38 (q, 4H, methylene) and 6.2 to 7.7 (m, 8H, Ar—H).

The lithium salt obtained under a nitrogen flow was dissolved in 50 ml of toluene.

The resultant solution was cooled to −78° C., followed by dropwise adding a suspension solution of toluene (20 ml) of 1.2 g (5.1 mmol) of zirconium tetrachloride which was pre-cooled to −78° C.

After the dropwise addition, the resultant solution was stirred at room temperature for 6 hrs, followed by distilling off the solvent of the reaction solution The obtained residues were recrystallized with dichloromethane to obtain 0.9 g (1.33 mmol) of (1,2'-dimethylsilylene)(2,1'-dimethylsilylene)bis(3-trimethylsilylmethylindenyl)zirconium chloride (yield:26%).

The measurement results by $^1$H-NMR (90 Mz, $CDC_{13}$) were δ0.0 (s, 18H, trimethylsilyl); 1.02, 1.12 (s, 12H, dimethylsilylene); 2.51 (dd, 4H, methylene); and 7.1 to 7.6 (m, 8H, Ar—H).

PRODUCTION EXAMPLE 2

Preparation of polyoctadecene

Into a 10 liter autoclave heated and dried was added 3 L of octadecene, 3 L of heptane, 5 mmol of triisobutylaluminum, 20 μmol of (1,2'-dimethylsilylene)(2,1'-dimethylsilylene)bis (3-trimethylsilylmethylindenyl)zirconium dichloride and 40 μmol of dimethylanilynium tetrakispentafluorophenylborate, followed by incorporating hydrogen of 0.1 MPa and subsequently polymerizing at a polymerization temperature of 60° C. for 420 min.

After the completion of the polymerization, the reaction product was precipitated with acetone, followed by heating and drying treatment under vacuum to obtain 1895 g of polyoctadecene which is a higher α-olefin polymer. The results of the properties of the obtained polymer evaluated by the above-mentioned methods are shown below.

X1: 21.2°
X1 strength ratio: 100%
Mw (GPC): 95000
Mw/Mn: 1.7
ΔH: 80 J/g
Tm: 42° C.
Wm (DSC peak half-width temperature): 3.1° C.

PRODUCTION EXAMPLE 3

Preparation of polyC$_{20\text{-}24}$

Into a 10 liter autoclave heated and dried was added 2.8 kg of "LINEALENE 2024" manufactured by IDEMITSU PETROCHEMICAL CO., 4 L of heptane, 5 mmol of triisobutylaluminum, 20 μmol of (1,2'-dimethylsilylene)(2,1'-dimethylsilylene)bis(3-trimethylsilylmethylindenyl)zirconium dichloride and 40 μmol of dimethylanilynium tetrakispentafuorophenylborate, followed by incorporating hydrogen of 0.1 MPa and subsequently polymerizing at a polymerization temperature of 60° C. for 480 min.

After the completion of the polymerization, the reaction product was precipitated with acetone, followed by heating and drying treatment under vacuum to obtain 1500 g of poly C$_{20\text{-}24}$ which is a higher α-olefin polymer. The results of the properties of the obtained polymer evaluated by the above-mentioned methods are shown below.

X1: 21.3°
X1 strength ratio: 100%
Mw (GPC): 48000
Mw/Mn: 1.6
ΔH: 82 J/g
Tm: 49° C.
Wm (DSC peak half-width temperature): 2.3° C.

EXAMPLE 1

Into a 100 ml separable three-neck flask equipped with a stirring blade was added 30 g of polyoctadecen obtained in Production Example 2, followed by increasing the temperature to 160 ° C. and subsequently adding 0.19 ml of di-t-butyl peroxide and 0.4 g of anhydrous maleic acid.

After stirring for approximately 30 min, the resultant solution was fed to a stainless vat, followed by cooling to obtain 30 g of an acid modified polyoctadecene which is a higher α-olefin polymer.

Then, the obtained acid modified polyoctadecene was press molded, and the resultant molded product was measured for Mw and Mw/Mn, surface tension (wetting tension test) and acid modification quantity by the above-mentioned methods. These results are shown in Table 1.

EXAMPLE 2

In the same manner as in Example 1 except that 30 g of the polyC$_{20\text{-}24}$ obtained in Production Example 3 was used in place of 30 g of polyoctadecene, 30 g of acid modified polyC$_{20\text{-}24}$ was obtained.

Then, the acid modified polyC20.24 was press molded, and the resultant molded product was measured for Mw and Mw/Mn, surface tension (wetting tension test) and acid modification quantity by the above-mentioned methods. These results are shown in Table 1.

EXAMPLE 3

In the same manner as in Example 1 except that 15 g of acrylic acid was used in place of 0.4 g of anhydrous maleic acid, reaction and recovery were carried out, followed by vacuum drying at 100° C. to obtain 40 g of acid modified polyoctadecene.

Then, the acid modified polyoctadecene was press molded, and the resultant molded product was measured for Mw and Mw/, surface tension (wetting tension test) and acid modification quantity by the above-mentioned methods. These results are shown in Table 1.

COMPARATIVE EXAMPLE 1

The polyoctadecene obtained in Production Example 2 was press molded as is without modification, and the resultant molded product was measured for surface tension (wetting tension test) and acid modification quantity by the above-mentioned methods. These results are shown in Table 1.

COMPARATIVE EXAMPLE 2

The polyC$_{20\text{-}24}$ obtained in Production Example 3 was press molded as is without modification, and the resultant-molded product was measured for surface tension (wetting tension test) and acid modification quantity by the above-mentioned methods. These results are shown in Table 1. The evaluation results of the solubility in acetone/heptane are shown in Table 2.

EXAMPLE 4

Into a 200 ml flask substituted with nitrogen was added 5 g of the polyoctadecene prepared in Production Example 2, followed by adding 50 ml of 1,1,1-trichloroethane dehydrated by nitrogen bubbling and subsequently dissolving under reflux.

To the resultant solution was dropwise added sequentially 1.0 ml of sulfonyl chloride and a solution in which 50 mg of azobisisobutyronitrile (AIBN) was dissolved in 3 ml of trichloroethane.

After stirring for 2 hrs, the reaction product was poured into methanol, followed by recovering and drying the precipitate to obtain 4 g of chlorinated polyoctadecene.

Then, the chlorinated polyoctadecene was press molded, and the resultant molded product has a wetting tension of 330 μN/cm, 5% by weight of a chlorine content, a weight average molecular weight (Mw) of 50000 and a Mw/Mn of 1.8 as measured by the above-mentioned methods.

Further, the evaluation results of solubility to acetone/heptane are shown in Table 2.

TABLE 1

| | Weight average molecular weight Mw | Molecular weight distribution Mw/Mn | Acid modification quantity (% by weight) | Surface tension (μN/cm) |
|---|---|---|---|---|
| Example 1 | 93000 | 1.8 | 0.20 | 350 |
| Example 2 | 49000 | 1.7 | 0.18 | 350 |
| Example 2 | 71000 | 2.1 | 25.30 | 350 |
| Comparative Example 1 | 95000 | 1.7 | — | 330 |
| Comparative Example 2 | 48000 | 1.6 | — | 330 |

TABLE 2

| | Acetone/Heptane (volume ratio) | |
|---|---|---|
| | 20/50 | 30/50 |
| Example 4 | Excellent | Excellent |
| Comparative Example 2 | Excellent | Poor |

INDUSTRIAL APPLICABILITY

As is explained hereinabove, a higher olefin polymer having a polar group obtained by the production methods of the present invention has high compatibility, mixability and adhesiveness because of the high polarity.

For this reason, the higher olefin polymer having a polar group of the present invention is suitable as a material used for a resin modifier, a paint ingredient, an ink ingredient, an adhesive ingredient, a primer component, a lubricating oil component, a regenerator ingredient and a high performance wax and the like.

The invention claimed is:

1. A higher olefin polymer having a polar group which is produced by subjecting to an incorporation reaction of a polar compound or halogen compound into a higher α-olefin polymer satisfying the requirements of the following (1) and (2), which is obtained by polymerizing one or more higher α-olefins having 10 or more carbon atoms or copolymerizing one or more higher α-olefins having 10 or more carbon atoms with one or more other olefins:
    (1) the content of units of a higher α-olefin having 10 or more carbon atoms is 50 mol % or more;
    (2) a single peak X1 which is ascribed to crystallization of a side chain derived from the higher α-olefin and observed at 15 deg <2θ<30 deg in a wide-angle X-ray scattering intensity distribution is observed.

2. The higher olefin polymer having a polar group according to claim 1, wherein the higher olefin polymer having a polar group is produced by subjecting to an incorporation reaction of a polar compound or a halogen compound and a decomposer into a higher α-olefin polymer.

3. The higher olefin polymer having a polar group according to claim 1, wherein the higher olefin polymer having a polar group satisfies the requirements of the following (3) and (4):
    (3) a polystyrene conversion weight-average molecular weight (Mw) measured by gel permeation chromatography (GPC) ranges from 1,000 to 100,000 and the molecular weight distribution (Mw/Mn) is 1.5 or more;
    (4) a polar group contents or halogen contents range from 0.01 to 70% by weight.

4. The higher olefin polymer having a polar group according to claim 1, wherein the higher olefin polymer having a polar group satisfies the requirements of the following (3) and (4'):
    (3) a polystyrene conversion weight-average molecular weight (Mw) by measured by gel permeation chromatography (GPC) ranges from 1,000 to 100,000 and the molecular weight distribution (Mw/Mn) is 1.5 or more;
    (4') achlorine atom content ranges from 0.01 to 70% by weight.

5. The higher olefin polymer having a polar group according to claim 1, wherein the higher olefin polymer having a polar group satisfies the requirements of the following (5) and (6):
    (5) the solubility into acetone/heptane (30/50 (volume ratio)) at 30° C. at a polymer concentration from 10 to 20% by weight is 99% or more by weight;
    (6) a surface tension of wetting tension testing is in the range of 300 to 400 μN/cm.

6. A method for producing a higher olefin polymer having a polar group which is obtained by polymerizing one or more higher α-olefins having 10 or more carbon atoms or copolymerizing one or more higher α-olefins having 10 or more carbon atoms with one or more other olefins to form a higher α-olefin polymer satisfying the requirements of the following (1) and (2) and subsequently subjecting to an incorporation reaction of a polar compound or halogen compound into the higher α-olefin polymer:
    (1) the content of units of a higher α-olefin having 10 or more carbon atoms is 50 mol% or more;
    (2) a single peak X1 which is observed at 15 deg<2θ<30 deg in a wide-angle X-ray scattering intensity distribution and is ascribed to crystallization of the side chain derived from the higher α-olefin is observed.

7. The method for producing a higher olefin polymer having a polar group according to claim 6, wherein the method comprises obtaining the higher α-olefin polymer and subsequently subjecting to an incorporation reaction of a polar compound or a halogen compound and a decomposer.

8. The method for producing a higher olefin polymer having a polar group according to claim 6, wherein the polar compound is at least one kind of compound selected from the group consisting of anhydrous maleic acid, acrylic acid and acrylic ester.

9. The method for producing a higher olefin polymer having a polar group according to claim 6, wherein the polar compound is at least one kind of compound selected from the group consisting of chlorine and a chlorine containing compound.

10. An olefin polymer containing polar and/or halogen groups produced by:
    polymerizing or copolymerizing one or more α-olefin(s) having 10 or more carbon atoms thus producing a higher α-olefin polymer that
    (1) has a content of units of said one or more α-olefin(s) having 10 or more carbon atoms of 50 mol % or more; and
    (2) forms a single peak X1 at 15 deg <2θ<30 deg as observed by wide-angle X-ray scattering intensity distribution; and
    incorporating at least one polar compound and/or halogen compound into said higher α-olefin polymer, thus producing a higher α-olefin polymer containing polar and/or halogen groups.

11. The olefin polymer containing polar and/or halogen groups of claim 10, comprising polymerizing or copolymerizing one or more α-olefin(s) having 10 to 35 carbon atoms, to produce the higher α-olefin polymer.

12. The olefin polymer containing polar and/or halogen groups of claim 10, wherein (1) the higher α-olefin polymer has a content of units of said one or more α-olefin(s) having 10 or more carbon atoms of 70-100 mol %.

13. The olefin polymer containing polar and/or halogen groups of claim 10, wherein said polar groups are selected from the group consisting of fluorine, chlorine, bromine, and/or iodine.

14. The olefin polymer containing polar and/or halogen groups of claim 10, wherein said polar groups are selected from the group consisting of an ester group, a carboxyl group, and derivatives thereof.

15. The olefin polymer containing polar and/or halogen groups of claim 10, which:
   (3) has a polystyrene conversion weight-average molecular weight (Mw) measured by gel permeation chromatography (GPC) ranging from 1,000 to 100,000 and the molecular weight distribution (Mw/Mn) is 1.5 or more; and
   (4) has polar group content or halogen content ranging from 0.01 to 70% by weight.

16. The olefin polymer containing polar and/or halogen groups of claim 10, which:
   (3) has a polystyrene conversion weight-average molecular weight (Mw) as measured by gel permeation chromatography (GPC) ranging from 1,000 to 100,000 and the molecular weight distribution (Mw/Mn) is 1.5 or more; and
   (4') a chlorine atom content ranging from 0.01 to 70% by weight.

17. The olefin polymer containing polar and/or halogen groups of claim 10, which:
   (5) has a solubility of 99% or more by weight as determined by dissolving 10 to 20% of said olefin polymer into acetone/heptane at a 30/50 volume ratio at 30° C.; and
   (6) has a surface wetting tension in the range of 300 to 400 μN/cm.

18. A method for producing an olefin polymer having polar and/or halogen groups comprising:
   polymerizing one or more higher α-olefins having 10 or more carbon atoms or copolymerizing one or more higher α-olefins having 10 or more carbon atoms with one or more other olefins to form a higher α-olefin polymer satisfying the requirements of the following (1) and (2); and subsequently
   subjecting to an incorporation reaction of a polar compound or halogen compound into the higher α-olefin polymer; wherein requirements (1) and (2) are:
   (1) the content of units of a higher α-olefin having 10 or more carbon atoms is 50 mol % or more; and
   (2) a single peak X1 which is observed at 15 deg <2θ<30 deg in a wide-angle X-ray scattering intensity distribution and is ascribed to crystallization of the side chain derived from the higher α-olefin is observed.

19. The method of claim 18, wherein said polymerizing one or more higher α-olefins having 10 or more carbon atoms or copolymerizing one or more higher α-olefins having 10 or more carbon atoms with one or more other olefins to form a higher α-olefin polymer is performed in the presence of a C1-symmetric or C2-symmetric transition metal catalyst.

20. The method of claim 18, wherein said polymerizing one or more higher α-olefins having 10 or more carbon atoms or copolymerizing one or more higher α-olefins having 10 or more carbon atoms with one or more other olefins to form a higher α-olefin polymer is performed in the presence of a catalyst of formula (I):

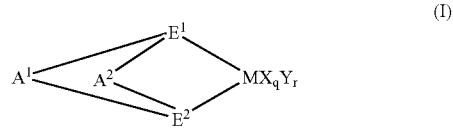

wherein:
   $A^1$ and $A^2$ each, independently, are divalent cross-linking groups that bond two ligands and are selected from the groups consisting of a hydrocarbon group having 1 to 20 carbon atoms, halogen-containing hydrocarbon group having 1-20 carbon atoms, a silicon-containing group, a germanium-containing group, a tin-containing group, —O—, —CO—, —S—, —SO$_2$—, —Se—, —NR$^1$—, —P R$^1$—, —P(O)R$^1$—, B R$^1$, and Al R$^1$; wherein R$^1$, independently, represents a hydrogen atom, a halogen atom, a hydrocarbon group having 1-20 carbon atoms, or a halogen-containing hydrocarbon group having 1-20 carbon atoms;
   $E^1$ and $E^2$, each, independently, represent a ligand selected from the group consisting of a substituted cyclopentadienyl group, an indenyl group, a substituted indenyl group, a heterocyclopentadienyl group, a substituted heterocyclopentadienylgroup, an amide group, a phosphine group, a hydrocarbon group, and a silicon-containing group, wherein E1 and E2 form a cross-linking structure via $A^1$ and $A^2$;
   M represents a metal element of Groups 3-10 of the Periodic Table or the lanthanoid series;
   X represents an α-binding ligand and when more than one X is present, X's may be different or the same and each X may cross-link with other X, $E^1$, $E^2$ or Y groups;
   q is an integer of 1, 2, 3, 4, or 5;
   Y represents a Lewis base, and when more than one Y is present, Y's may be the same or different and may cross-link with other Y, $E^1$, $E^2$, or X groups; and
   r is an integer of 0, 1, 2 or 3.

* * * * *